Patented Nov. 24, 1925.

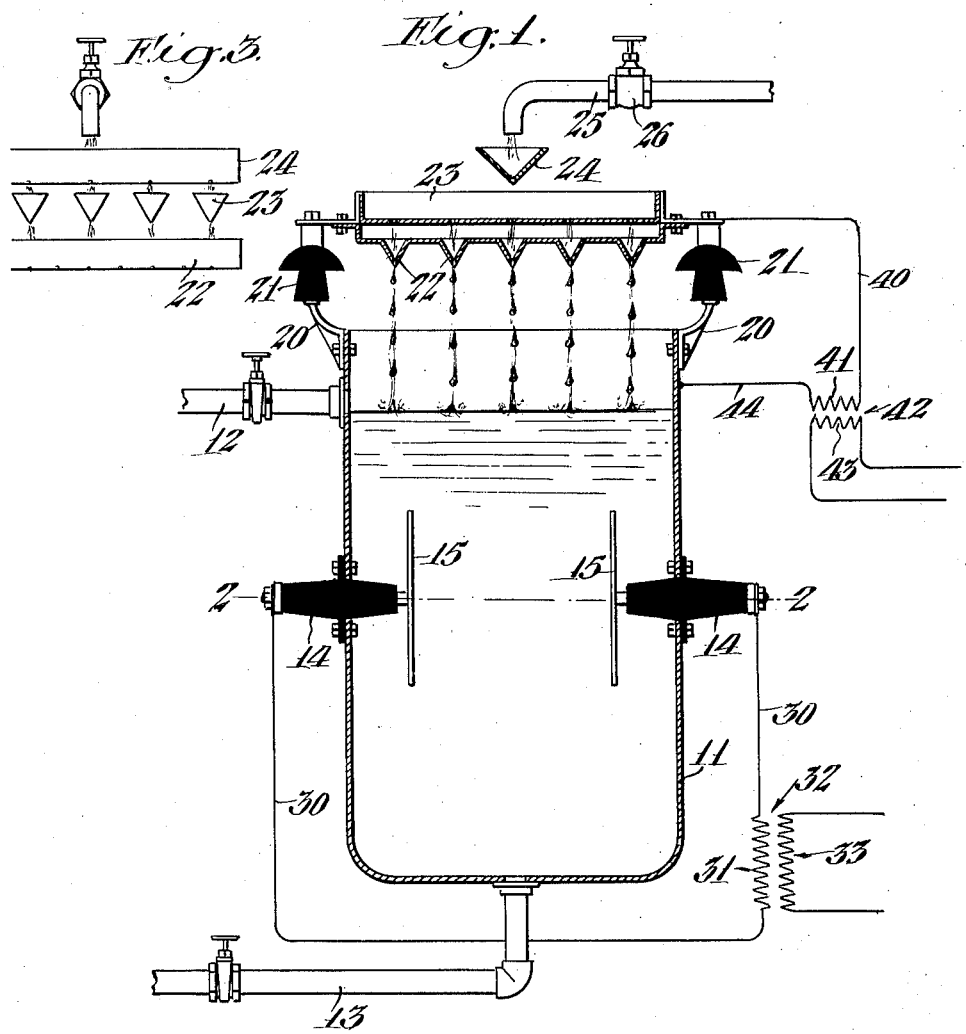

1,562,712

UNITED STATES PATENT OFFICE.

WYNN MEREDITH, OF ALAMEDA, CALIFORNIA, ASSIGNOR TO PETROLEUM RECTIFYING COMPANY, OF SAN FRANCISCO, CALIFORNIA, A CORPORATION OF CALIFORNIA.

PROCESS OF AND APPARATUS FOR DEHYDRATING EMULSIONS BY EXTERNALLY-CHARGED PARTICLES.

Application filed February 14, 1921. Serial No. 444,947.

*To all whom it may concern:*

Be it known that I, WYNN MEREDITH, a citizen of the United States, residing at Alameda, county of Alameda, State of California, have invented a new and useful Improvement Comprising the Process of and Apparatus for Dehydrating Emulsions by Externally-Charged Particles, of which the following is a specification.

My invention is particularly applicable to the art of dehydrating petroleum emulsions although it is generally applicable to the separation of conducting particles of any kind from a more or less perfect insulating media.

It is a well known fact that emulsions, which consist of conducting particles, for example, water drops, carried in an insulating media such as petroleum oil, may be dehydrated by introducing the emulsion into an electric field. The drops of water are given electric charges which cause them to attract each other and coalesce and which also cause them to move towards or away from the electrodes which produce the initial charge. This coalescence and movement tends to produce larger drops which seem to act as nuclei for further and more rapid coalescence so that the action seems to accelerate very rapidly once the formation of larger charged particles starts. Where the water drops are small it is often difficult to start the action, and it is an object of my invention to overcome this difficulty by introducing large charged particles into the emulsion being treated, these particles being given their charge before being introduced into the emulsion.

I further introduce particles having both a positive and a negative charge and in some cases I allow these oppositely charged particles to fall indiscriminately through an alternating field.

In the following specification I will describe my invention as used in the art of dehydrating petroleum emulsions.

Petroleum emulsions are of common occurrence in the production, transportation and utilization of petroleum oils and are often very troublesome due to the fact that the water particles contained therein are so small that they will not readily settle out of the oil by gravitational action.

It is an object of my invention to provide means for causing these small particles of water to coalesce into larger drops which will readily settle by gravitational methods.

Further objects and advantages will be made evident hereinafter.

Referring to the drawing,

Fig. 1 is a sectional elevation of one form of apparatus adapted to carry on my process.

Fig. 2 is a section on a plane indicated by the line 2—2 of Fig. 1.

Fig. 3 is an end view of a portion of the apparatus shown in Fig. 1.

In the form of the apparatus illustrated, 11 is a container having an inlet pipe 12 and an outlet pipe 13. Secured in the walls of the container are insulators 14 each having a conductor extending through the center thereof, each of which carry an electrode 15 at their inner end. Supported by brackets 20 and insulators 21 from the top of the container 11 are a series of troughs 22, 23 and 24, these troughs having a multiplicity of holes along their length. The trough 24 is supplied with water through a pipe 25 controlled by a valve 26 and this water is evenly distributed by the trough 24 into the troughs 23 and by these troughs into the troughs 22 falling in a series of drops therefrom. The electrodes 15 are connected by means of wires 30 with the secondary 31 of a step up transformer 32, the primary 33 thereof being connected to any convenient source of alternating current. The troughs 22 are connected by means of a wire 40 with the secondary 41 of the step up transformer 42, the primary 43 of which is fed from any convenient source of alternating current. The other side of the secondary 41 is connected through a wire 44 with the container 11 or with the ground. Water is allowed to flow slowly through the pipe 25 into the pipe 24, being distributed into the troughs 23 which in turn distributes it into the troughs 22 from which the water emerges in a series of fine drops which falls into the emulsions in the container 11. The troughs 22 being connected to the secondary 41 of the transformer 42 are constantly being charged with a very high potential which alternates in direction. The drops which leave this trough 22 are, therefore, charged with electric charges of varying intensity and variable polarity, one series of drops having a positive charge and the other drops immediately following them having a negative charge. These charged water particles fall into the body of the emulsion and being considerably larger than the drops therein tend to fall therethrough, passing through the electric field set up between the electrodes 15. The minute drops in this field are also charged due to the field. This field is an alternating one and the charged particles are subjected to alternating forces therein. Each of the charged particles forms a sort of nucleus to which the small particles of water originally in the emulsion are attracted and with which these smaller particles are coalesced or amalgamated thus forming still larger particles which continue to travel downwardly, and which therefore will readily settle out from the emulsion in the bottom of the container 11. The apparatus may be operated by allowing emulsion to flow inwardly through the pipe 12 and outwardly through the pipe 13.

I claim as my invention:

1. A method of separating conducting particles from an insulating media which comprises imparting an electric charge to other particles; introducing said charged particles into said media; and subjecting said media and said charged particles to an electric stress.

2. A method of separating water particles from an emulsion of oil and water which comprises introducing into said emulsion electrically charged bodies and subjecting the emulsion to an electric stress for the purpose of causing a coalesence of water particles about said charged particles.

3. A method of dehydrating an emulsion which comprises dropping electrically charged particles into an electric field formed in said emulsion.

4. A method of dehydrating an emulsion which comprises dropping electrically charged water particles into an electric field formed in said emulsion.

5. A method of dehydrating a petroleum emulsion which comprises imparting an electric charge to a body of water; finely dividing said water to form charged particles; and dropping said particles into said emulsion which is simultaneously subjected to an electric stress.

6. A method of separating conducting particles from an insulating media which comprises passing electrically charged conducting particles through said media.

7. A method of separating conducting particles from an insulating media which comprises passing electrically charged conducting particles of different polarity through said media.

8. A method of separating conducting particles from an insulating media which comprises passing electrically charged conducting particles through said media which is simultaneously subjected to an electric stress.

9. A method of separating conducting particles from an insulating media which comprises passing electrically charged conducting particles of different polarity through said media, which is simultaneously subjected to an electric stress.

10. A method of separating conducting particles from an insulating media which comprises passing electrically charged conducting particles through said media which is simultaneously subjected to an electric stress of alternating polarity.

11. A method of separating conducting particles from an insulating media which comprises passing electrically charged conducting particles of different polarity through said media, which is simultaneously subjected to an electric stress of alternating polarity.

12. An apparatus for dehydrating an emulsion comprising a container for said emulsion; means for causing a rain of water particles to fall into said container; means for imparting an electric charge to said water particles before they enter said emulsion; and means for producing an electric field in said emulsion.

In testimony whereof, I have hereunto set my hand at San Francisco, California, this 7th day of February 1921.

WYNN MEREDITH.